US009420506B2

(12) United States Patent
Snider et al.

(10) Patent No.: US 9,420,506 B2
(45) Date of Patent: Aug. 16, 2016

(54) METHOD AND APPARATUS TO FACILITATE INFLUENCING HANDOVER DECISIONS

(75) Inventors: James Snider, Kildeer, IL (US); Chia-Ching Chen, Morton Grove, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1422 days.

(21) Appl. No.: 12/512,586

(22) Filed: Jul. 30, 2009

(65) Prior Publication Data

US 2011/0028149 A1 Feb. 3, 2011

(51) Int. Cl.
*H04W 36/00* (2009.01)
*H04W 36/30* (2009.01)

(52) U.S. Cl.
CPC .......... *H04W 36/0083* (2013.01); *H04W 36/30* (2013.01)

(58) Field of Classification Search
CPC .......................... H04W 36/0083; H04W 36/30
USPC ........... 455/436–444; 370/328, 338, 331–334
See application file for complete search history.

(56) References Cited

U.S. PATENT DOCUMENTS 5,175,867 A * 12/1992 Wejke .................. H04W 36/30 455/438
5,390,365 A * 2/1995 Enoki ...................... H04L 1/20 455/226.2
5,408,696 A * 4/1995 Hofverberg .......... H04B 17/318 455/186.1
5,649,290 A * 7/1997 Wang .................... H04W 36/30 370/332
5,722,072 A * 2/1998 Crichton ............... H04W 36/04 455/437
6,119,005 A * 9/2000 Smolik ................ H04B 7/2628 370/320
6,792,284 B1 * 9/2004 Dalsgaard ......... H04W 36/0094 370/331
2004/0087334 A1 * 5/2004 Nishiyama ................. 455/550.1
2007/0032237 A1 * 2/2007 Chang et al. .................. 455/436
2007/0275722 A1 * 11/2007 Thorson et al. ............... 455/436
2007/0298798 A1 12/2007 Hagerman et al.
2008/0311914 A1 * 12/2008 Tinnakornsrisuphap .................. H04W 36/0083 455/436
2009/0011757 A1 * 1/2009 Tenny ................... H04W 36/30 455/425

FOREIGN PATENT DOCUMENTS

WO 2009/064553 A1 5/2009

* cited by examiner

*Primary Examiner* — Sharad Rampuria

(57) ABSTRACT

A cellular communications system end-user transceiver (303) automatically determines (101) at least one received signal strength metric as corresponds to both a presently-utilized base station (307) and at least one presently un-utilized base station (309) to provide one or more corresponding received signal strength values. This transceiver then determines (102) whether to purposefully alter this received signal strength value(s). When deciding to make the alteration, the transceiver automatically alters (104) the received signal strength value(s) to provide one or more corresponding altered signal strength values. The transceiver then transmits (105) the latter in order to influence a handover decision in favor of handing over the transceiver from the presently-utilized base station to the presently un-utilized base station.

11 Claims, 3 Drawing Sheets

100

200

Rx Level

| | | | | | | | | |
|---|---|---|---|---|---|---|---|---|
| >10 | 0 | 0 | 0 | 0 | 0 | 0 | 0 | 0 |
| 9 | +1/0 | 0 | 0 | 0 | 0 | 0 | 0 | 0 |
| 8 | +1/0 | +1/0 | 0 | 0 | 0 | 0 | 0 | 0 |
| 7 | +1/-1 | +1/0 | +1/0 | 0 | 0 | 0 | 0 | 0 |
| 6 | +1/-1 | +1/-1 | +1/0 | 0 | 0 | 0 | 0 | 0 |
| 5 | +1/-1 | +1/-1 | +1/0 | +1/0 | 0 | 0 | 0 | 0 |
| 4 | +2/-1 | +1/-1 | +1/-1 | +1/0 | 0 | 0 | 0 | 0 |
| 3 | +2/-1 | +1/-1 | +1/-1 | +1/0 | +1/0 | 0 | 0 | 0 |
| 2 | +2/-1 | +2/-1 | +1/-1 | +1/-1 | +1/0 | 0 | 0 | 0 |
| 1 | +2/-2 | +2/-2 | +1/-1 | +1/-1 | +1/0 | +1/0 | 0 | 0 |
| 0 | +2/-2 | +2 /-2 | +2/-1 | +1/-1 | +1/-1 | +1/0 | +1/0 | 0 |
| | 7 | 6 | 5 | 4 | 3 | 2 | 1 | 0 |

Rx Quality

*FIG. 2*

METHOD AND APPARATUS TO FACILITATE INFLUENCING HANDOVER DECISIONS

TECHNICAL FIELD

This invention relates generally to transceivers that operate compatibly with a handover-based wireless communications system.

BACKGROUND

Handover-based wireless communications systems are known in the art. Cellular telephony networks are an example in this regard. In such a system, a transceiver can be handed over from a presently-utilized base station to another base station in order to maintain the transceiver's connection to the network. This can be appropriate, for example, as the transceiver moves and the strength of the signal from the presently-utilized base station becomes weaker. To facilitate such handovers, such transceivers often monitor and report one or more received signal strength metrics regarding both the presently-utilized base station and at least one other base station (typically the strongest base station(s) that the transceiver can detect other than the presently-utilized base station). The network utilizes such information to determine whether and when to effect such a handover. (As used herein, the expression "handover" will be understood to refer to switching a transceiver from one base station to another, both during an idle mode operating state (in order to maintain the transceiver's registration with the network) as well as during a cell-reselection process as occurs during a call (in order to support discontinuous support of the call).)

In some application settings the network may switch the transceiver back-and-forth multiple times between a same pair of base stations as each base station exhibits superior signal strength in a back-and-forth manner notwithstanding that both base stations are providing an acceptable level of support. This undesired behavior can lead to an undue consumption of network resources as handovers require more resources than many other activities and functionality. Many networks make use of an administrator-selectable cell reselection hysteresis parameter to attempt to control this unwanted behavior. In many application settings this parameter represents a handover threshold regarding a required level of difference between the presently-utilized base station and a candidate base station. For example, with a value of "6," the network will not permit a handover unless and until the candidate base station's signal betters the presently-utilized base station's signal by at least 6 dB.

Such an approach, however, can prove troublesome to at least some users in areas where signal strength is relatively weak for both the presently-utilized base station and all handover candidate base stations. For example, when the signal strength for the presently-utilized base station is −108 dBm and the signal strength for a given neighboring base station is −106 dBm, such an approach will often block a handover to the neighboring base station (as the difference in signal strength between these two base stations is only 2 dB) notwithstanding that a handover will represent an improvement in signal strength and might represent the difference between seamlessly continuing a call or dropping the call. In such a case, what is generally useful and helpful to the network under strong signal conditions can prove ruthlessly harmful to the user at weaker signal strengths.

BRIEF DESCRIPTION OF THE DRAWINGS

The above needs are at least partially met through provision of the method and apparatus to facilitate influencing handover decisions described in the following detailed description, particularly when studied in conjunction with the drawings, wherein:

FIG. 2 comprises a table as configured in accordance with various embodiments of the invention;

Figure 1:
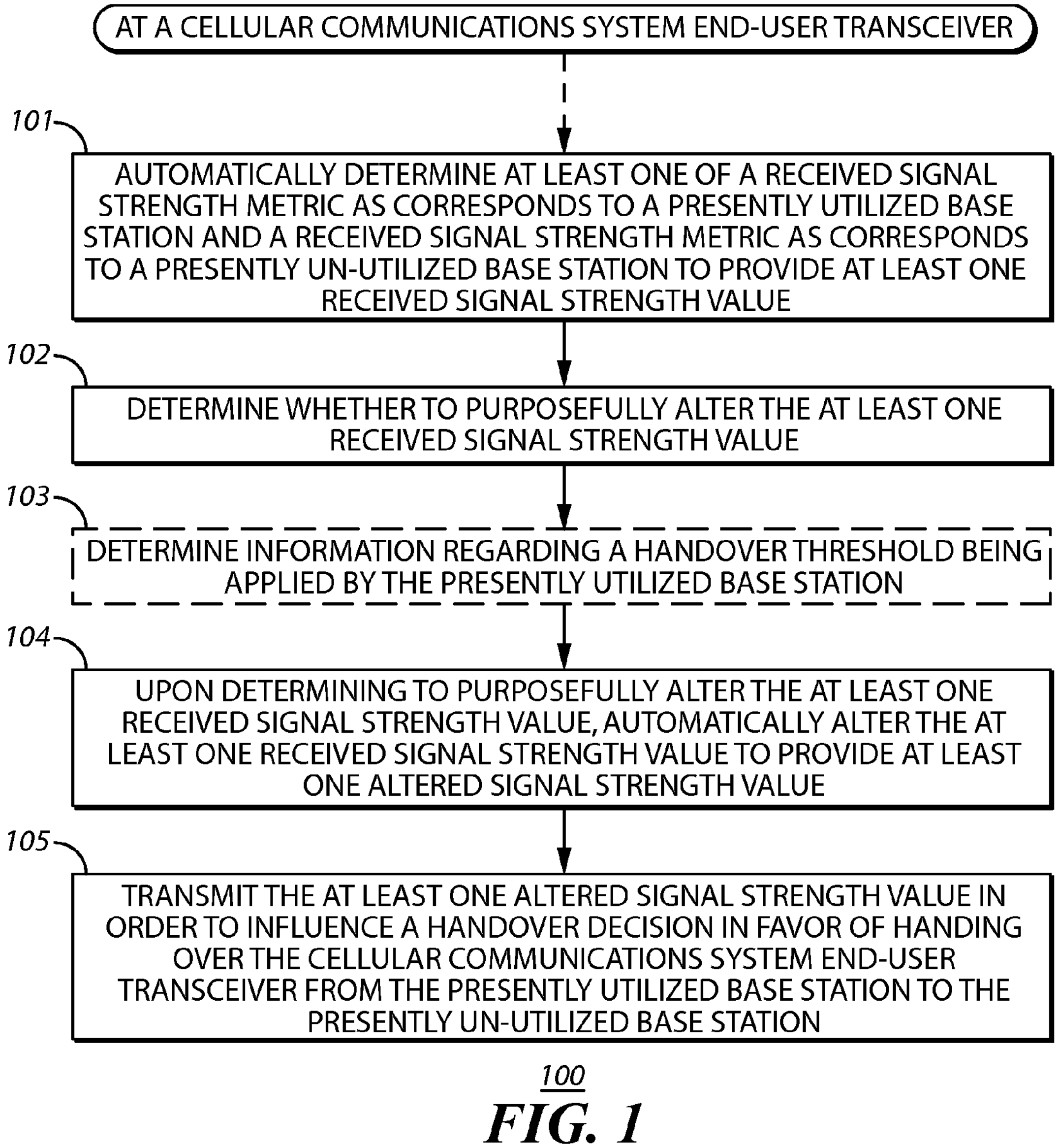
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a cellular communications system end-user transceiver automatically determines at least one received signal strength metric as corresponds to both a presently-utilized base station and at least one presently un-utilized base station to provide one or more corresponding received signal strength values. This transceiver then determines whether to purposefully alter this received signal strength value(s). When deciding to make the alteration, the transceiver automatically alters the received signal strength value(s) to provide one or more corresponding altered signal strength values. The transceiver then transmits the latter in order to influence a handover decision in favor of handing over the transceiver from the presently-utilized base station to the presently un-utilized base station.

If desired, this approach can be limited to use only when the received signal strength metric as corresponds to the presently-utilized base station is sufficiently weak. This will prevent this approach from unduly undercutting the protection the network seeks to maintain with respect to unwarranted and unwanted handovers while tending to ensure that this approach will be available when needed.

By one approach, these teachings will optionally also accommodate having the transceiver determine information regarding a handover threshold that is presently being applied by the presently-utilized base station. The aforementioned step of automatically altering the received signal strength value(s) can then be subject, at least in part, to this information regarding the handover threshold. Using this approach, the decision regarding whether to purposefully alter the value(s) and/or an amount by which to alter the value(s) can be influenced by the relative harshness of the required signal strength spread being required by a given network.

So configured, a transceiver can influence the handover decision-making process in a manner that can be respectful of avoiding undue handovers while tending to improve the likelihood that a given call will persist and not be dropped notwithstanding generally poor signal conditions. Those skilled in the art will appreciate that these teachings achieve such benefits without requiring any alterations to the programming or configuration of the corresponding handover-based communications network. It will also be understand that these teachings are easily and economically implemented and can even be applied in conjunction with already-fielded equipment if desired.

These and other benefits may become clearer upon making a thorough review and study of the following detailed description. Referring now to the drawings, and in particular to FIG. 1, an illustrative process 100 that is compatible with many of these teachings will now be presented. This process 100 can be carried out by a transceiver that compatibly operates with a handover-based wireless network such as a cellular communications system end-user transceiver. By one approach, for example, this transceiver can comprise a vehicular telematics transceiver.

Pursuant to step 101 this process 100 provides for automatically determining at least one of (1) a received signal strength metric as corresponds to a presently-utilized base station and (2) a received signal strength metric as corresponds to a presently un-utilized base station to thereby provide at least one received signal strength value. There are various known metrics in these regards (such as the well known Received Signal Strength Indicator (RSSI)). As these teachings are not overly sensitive to any particular selection in this regard, for the sake of brevity and the preservation of clarity, further elaboration in this regard will not be presented here.

For many application settings it may be particularly helpful to automatically determine a received signal strength metric for both the presently-utilized base station as well as the presently un-utilized base station. Using this approach, this step 100 will yield a first received signal strength value (as corresponds to the presently-utilized base station) and a second received signal strength value (as corresponds to the presently un-utilized base station). Using this approach, it will also often be useful if the presently un-utilized base station is a neighboring base station (to the presently-used based station) that exhibits the best signal strength of all presently un-utilized base stations as are presently available to the transceiver.

At step 102 this process 100 then provides for determining whether to purposefully alter the at least one received signal strength value. This decision can be based, if desired and at least in part, upon the received signal strength metric as corresponds to the presently utilized base station. For example, the transceiver can be configured to only consider such a purposeful alteration when the received signal strength value for the presently-utilized base station is sufficiently weak. This may comprise using a particular threshold value (such as, for example, 3 dB) and then determining whether the present received signal strength metric is equal to or less than this threshold value. When true, the signal strength for the presently-utilized base station can be presumed to be sufficiently weak to justify a purposeful alteration of one or more of the received signal strength values as per this process 100.

As noted earlier, this process 100 will accommodate determining more than one received signal strength value at step 101. For example, such a value can be determined for both the presently-utilized base station and the presently un-utilized base station. In such a case, this step 102 of determining whether to purposefully alter the received signal strength value can comprise a determination regarding whether to purposefully alter one or both of these received signal strength values.

Also as noted earlier, the particular handover threshold utilized by a given handover-based wireless communication system can vary from one network to another. Such variations are due, at least in part, to the fact that this threshold usually comprises a variable that can be selectively set by the network administrator (at least within some overall range of permissible values). By way of illustration and not by way of limitation, one network might require that a neighboring base station have a signal that beats the presently-utilized base station's signal by 8 dB while another network might only require a 3 dB improvement.

With the foregoing in mind, this process 100 will also accommodate the optional step 103 of determining information regarding one or more handover thresholds being applied by the presently-utilized base station. In some cases, this might involve simply referring to a look-up table that is available to the transceiver. In other cases, this information might be transmitted from time to time by the presently-utilized base station. In any event, and however obtained, this information can be utilized as described further below.

This process 100 then provides the step 104 of, upon having determined to purposefully alter the one or more received signal strength values, automatically altering the one or more received signal strength values to provide one or more corresponding altered signal strength values. By one approach, for example, this can comprise providing an altered signal strength value for the presently-utilized base station. By another approach, and again by way of example, this can comprise providing an altered signal strength value for the presently un-utilized base station. And, of course, this can also comprise providing both an altered signal strength value for the presently-utilized base station and an altered signal strength value for the presently un-utilized base station.

Generally speaking, the point of providing one or more altered signal strength values is to cause the presently un-utilized base station to appear to provide a better signal than the presently-utilized base station than is, in fact, accurate. This, in turn, is done in order to unduly influence the handover decision-making of the presently-utilized base station.

As a simple non-limiting example in these regards, in a given application setting the handover threshold for a given network may be set at 5 dB. In this example, the actual received signal strength value for the presently-utilized base station is −108 dm and the actual received signal strength value for the presently un-utilized base station is −106 dBm. The difference in received signal strength between these two base stations is therefore only 2 dB and hence is insufficient to prompt the presently-utilized base station to initiate the handover process. By altering, however, the received signal strength value for the presently-utilized base station to −109 dBm and the received signal strength value for the presently un-utilized base station to −104 dBm, the resultant difference is 5 dB and would therefore be sufficient to prompt the presently-utilized base station to hand over the call to the presently un-utilized base station. This, in turn, would improve the transceiver's signal conditions and decrease the likelihood that this call will be dropped.

As noted, one value or the other (or both) can be altered to achieve the desired spread. It should be noted, however, that it may generally be somewhat preferable to increase the apparent signal strength of the presently un-utilized base station. This is because some networks may simply presume that a call has been lost or that conditions are inadequate to support a handover when the signal strength for the presently-utilized base station is too weak. Therefore, altering the received signal strength value for the presently-utilized base station by reducing this value to too low a value can be counterproductive.

There are various ways to facilitate the step 104 of altering these received signal strength values. By one approach, and without intending any limitations in these regards, the transceiver can employ one or more look-up tables. By way of illustration, and again without intending any limitations by way of this example, FIG. 2 presents an example of such a look-up table 200. In this illustrative example the Y-axis corresponds to the actual received signal strength value for the presently-utilized base station while the X-axis corresponds to the handover threshold employed by the presently-utilized base station when making a handover decision (i.e., in this case, the required improvement between the presently un-utilized base station and the presently-utilized base station).

In this illustrative table 200, each non-zero cell has two numbers (along with an arithmetic indicator to designate whether the number is to be employed in an additive or a subtractive manner). The first number corresponds to adjustment of the received signal strength value for the presently un-utilized base station. The second number, in turn, corresponds to adjustment of the received signal strength value for the presently-utilized base station.

Consider, as an illustrative example, an application where the network requires a handover threshold of 6 dB, the received signal strength value for the presently-utilized base station is −108 dBm, and the received signal strength value for the presently un-utilized base station is −104 dBm. −104 dBm−(−108 dBm)=4 dB and therefore the received signal strength value difference is less than the required 6 dB and hence the presently-utilized base station will not initiate a handover.

The look-up table values that correspond to this set of circumstances read +2/−1. This means that the received signal strength value for the presently un-utilized base station is to be altered by increasing that value by 2 dB. This will yield an altered received signal strength value of −102 dBm. This also means that the received signal strength value for the presently-utilized base station is to be altered by reducing that value by 1 dB. This will yield an altered received signal strength value of −109 dBm. Using these altered values, −102 dBm−(−109 dBm)=7 dB. 7 dB, of course, exceeds the 6 dB handover threshold requirement and will prompt the presently-utilized base station to effect a handover to the presently un-utilized base station. Such a handover, of course, will greatly improve operating circumstances for the transceiver.

This look-up table 200 has a value of "0" for many of the cells. This is to represent that no alterations to either received signal strength values are to occur. This is to aid in ensuring that such alterations only occur when the alteration will be likely be genuinely useful to the transceiver. This will also aid in preventing these teachings from inappropriately undermining the intent of the network's use of a handover threshold which is to avoid unnecessary and unwanted switching back and forth between base stations when signal conditions are generally adequate regardless of which base station provides the point of connectivity for the transceiver.

Referring again to FIG. 1, this process 100 then provides the step 105 of transmitting the one or more altered signal strength values (to the presently-utilized base station) in order to influence a handover decision in favor of handing over the transceiver from the presently-utilized base station to the presently un-utilized base station. As used herein, this reference to "influence" will be understood to encompass a range of effectiveness. At one extreme of the range the influence can be singularly dispositive such that the handover decision is assured. At the opposing extreme the influence can be more tempered, such that the likelihood that the handover will occur is increased due to the influence but other factors may also be required before the handover decision is assured. It will be further understood that this "influence" can represent a degree of persuasiveness that is greater than what would exist in the absence of having applied these steps.

Figure 3:
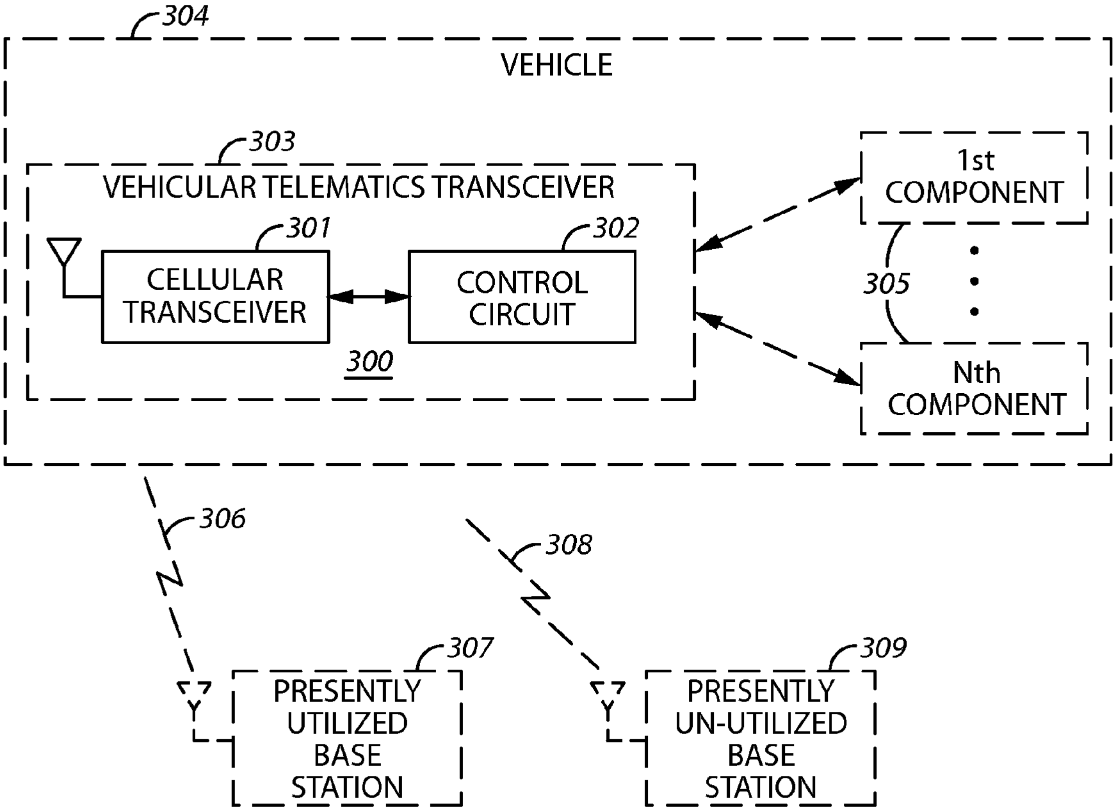
FIG. 3 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

In this illustrative example, the apparatus 300 comprises both a cellular transceiver 301 and a control circuit 302 that is operably coupled to the cellular transceiver 301. In this illustrative example, and without intending any limitations in these regards, the apparatus 300 comprises a vehicular telematics transceiver 302 which is itself installed within a corresponding vehicle 304 (including powered terrestrial vehicles such as automobiles, trucks, utility and construction vehicles, recreational vehicles, military vehicles, and so forth). In such a case, the vehicular telematics transceiver 303 itself will also likely communicatively couple to one or more components 305 (represented here by a 1st component through an Nth component where "N" will be understood to represent an integer greater than 1) that are also installed in the vehicle 304. The general form and function of both a cellular transceiver and a telematics transceiver are well known in the art and require no further elaboration here.

Those skilled in the art will recognize and appreciate that such a control circuit 302 can comprise a fixed-purpose hard-wired platform or can comprise a partially or wholly programmable platform. All of these architectural options are again well known and understood in the art and also require no further description here.

Those skilled in the art will understand that this control circuit 302 can be configured (using, for example, corresponding programming) to carry out one or more of the steps, actions, and/or functions described herein. This can include, if desired, configuring the control circuit 302 to:

- use the cellular transceiver 301 to automatically determine received signal strength metrics as correspond to a signal 306 from a presently-utilized base station 307 and a signal 308 from a presently un-utilized base station 309 to thereby provide corresponding received signal strength values;
- determine whether to purposefully alter these values;
- upon determining to purposefully alter these values, automatically altering at least one of these received signal strength values to provide corresponding altered value(s); and
- use the cellular transceiver 301 to transmit the altered value(s) to the presently-utilized base station 307 in order to influence the latter's handover decision-making process in favor of handing the apparatus 300 over to the presently un-utilized base station 309.

Figure 4:
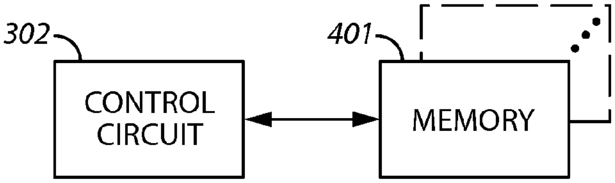
FIG. 4 comprises a block diagram as configured in accordance with various embodiments of the invention.

If desired, and referring now to FIG. 4, the control circuit 302 can itself include digital memory and/or can couple to one or more digital memories 401. Digital memories comprise a very well understood area of practice and therefore, for the sake of brevity, further discussion regarding such memories will be avoided here aside from noting that such a memory 401 can serve to store the aforementioned look-up table 200 and/or computer instructions that, when executed by the control circuit 302, cause the steps, actions, and/or functionality described herein to be carried out.

Those skilled in the art will recognize and understand that such an apparatus 300 may be comprised of a plurality of physically distinct elements as is suggested by the illustration shown in FIGS. 3 and 4. It is also possible, however, to view these illustrations as comprising logical views, in which case one or more of these components can be enabled and realized via a shared platform.

Those skilled in the art will recognize and appreciate that such an approach permits a given transceiver to make independent decisions, based upon presently-experienced operating conditions (i.e., weak reception conditions), regarding purposeful alterations of received signal strength information in order to present inaccurate information to the network (via the presently-utilized base station) in order to unduly influence a handover to another base station in order to increase the likelihood that a present call will not be dropped. It should be noted that these teachings are, in fact, not inconsistent with reception level reporting requirements as promulgated at 3GPP (3$^{rd}$ Generation Partnership Project) specification 51.010.

Field testing included an area with reliably-poor signal conditions. Using normal behavior while driving through this area, a wireless vehicular telematics platform experienced a dropped call eight times out of nine. When duplicating this activity with the same platform while applying these teachings, however, not a single call was dropped.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:

at an end-user transceiver of a handover-based communications system:

automatically determining a received signal strength value for a presently-utilized base station, a received signal strength value for a presently un-utilized base station, and a difference between the received signal strength value for the presently un-utilized base station and the received signal strength value for the presently-utilized base station;

determining a handover threshold being applied by the presently-utilized base station;

determining whether to purposefully increase the received signal strength value for the presently un-utilized base station based on the difference between the received signal strength value for the presently un-utilized base station and the received signal strength value for the presently-utilized base station such that it is determined to purposefully increase the received signal strength value for the presently un-utilized base station when the received signal strength value for the presently-utilized based station is sufficiently weak and the difference between the received signal strength value for the presently un-utilized base station and the received signal strength value for the presently-utilized base station is less than the handover threshold being applied by the presently-utilized base station;

upon determining to purposefully increase the received signal strength value for the presently un-utilized base station, automatically increasing the received signal strength value for the presently un-utilized base station to provide an increased signal strength value for the presently un-utilized base station such that the increased signal strength value for the presently un-utilized base station exceeds the received signal strength value for the presently-utilized based station by at least the handover threshold being applied by the presently-utilized base station; and transmitting the increased signal strength value for the presently un-utilized base station in order to influence a handover decision in favor of handing over the handover-based communications system end-user transceiver from the presently-utilized base station to the presently un-utilized base station.

2. The method of claim 1 wherein the end-user transceiver comprises a vehicular telematics transceiver.

3. The method of claim 1, wherein the presently un-utilized base station is a neighboring base station to the presently-utilized base station.

4. The method of claim 1, wherein the presently un-utilized base station exhibits the best signal strength of all presently un-utilized base stations that are presently available to the end-user transceiver.

5. An apparatus comprising:

a cellular transceiver;

a control circuit operably coupled to the cellular transceiver and being configured to:

use the cellular transceiver to automatically determine a received signal strength value for a presently-utilized base station, a received signal strength value for a presently un-utilized base station, and a difference between the received signal strength value for the presently un-utilized base station and the received signal strength value for the presently-utilized base station;

determine a handover threshold being applied by the presently-utilized base station;

determine whether to purposefully increase the received signal strength value for the presently un-utilized base station based on the difference between the received signal strength value for the presently un-utilized base station and the received signal strength value for the presently-utilized base station such that it is determined to purposefully increase the received signal strength value for the presently un-utilized base station when the received signal strength value for the presently-utilized based station is sufficiently weak and the difference between the received signal strength value for the presently un-utilized base station and the received signal strength value for the presently-utilized base station is less than the handover threshold being applied by the presently-utilized base station;

upon determining to purposefully increase the received signal strength value for the presently un-utilized base station, automatically increase the received signal strength value for the presently un-utilized base station to provide an increased signal strength value for the presently un-utilized base station such that the increased signal strength value for the presently un-utilized base station exceeds the received signal strength value for the presently-utilized based station by at least the handover threshold being applied by the presently-utilized base station;

transmit the increased signal strength value for the presently un-utilized base station via the cellular transceiver in order to influence a handover decision in favor of handing over the cellular communications system end-user transceiver from the presently-utilized base station to the presently un-utilized base station.

6. The apparatus of claim 5 wherein the apparatus comprises a vehicular telematics transceiver.

7. The apparatus of claim 5, wherein the presently un-utilized base station is a neighboring base station to the presently-utilized base station.

8. The apparatus of claim 5, wherein the presently un-utilized base station exhibits the best signal strength of all presently un-utilized base stations that are presently available to the end-user transceiver.

9. An apparatus comprising a non-transitory memory having computer instructions stored therein, which computer instructions, when executed, cause an end-user transceiver, of a handover-based communications system, to:

automatically determine a received signal strength value for a presently-utilized base station, a received signal strength value for a presently un-utilized base station, and a difference between the received signal strength value for the presently un-utilized base station and the received signal strength value for the presently-utilized base station;

determine a handover threshold being applied by the presently-utilized base station;

determine whether to purposefully increase the received signal strength value for the presently un-utilized base station based on the difference between the received signal strength value for the presently un-utilized base station and the received signal strength value for the presently-utilized base station such that it is determined to purposefully increase the received signal strength value for the presently un-utilized base station when the received signal strength value for the presently-utilized based station is sufficiently weak and the difference between the received signal strength value for the presently un-utilized base station and the received signal strength value for the presently-utilized base station is less than the handover threshold being applied by the presently-utilized base station;

upon determining to purposefully increase the received signal strength value for the presently un-utilized base station, automatically increase the received signal strength value for the presently un-utilized base station to provide an increased signal strength value for the presently un-utilized base station such that the increased signal strength value for the presently un-utilized base station exceeds the received signal strength value for the presently-utilized based station by at least the handover threshold being applied by the presently-utilized base station; and transmit the increased signal strength value for the presently un-utilized base station in order to influence a handover decision in favor of handing over the handover-based communications system end-user transceiver from the presently-utilized base station to the presently un-utilized base station.

10. The apparatus of claim 9, wherein the presently un-utilized base station is a neighboring base station to the presently-utilized base station.

11. The apparatus of claim 9, wherein the presently un-utilized base station exhibits the best signal strength of all presently un-utilized base stations that are presently available to the end-user transceiver.

* * * * *